Oct. 20, 1942.  E. C. S. CLENCH  2,299,211

FLUID PRESSURE REMOTE CONTROL SYSTEM

Filed May 7, 1940  4 Sheets-Sheet 1

E. C. S. Clench
INVENTOR

By: Stevens and Davis
ATTYS.

Oct. 20, 1942.　　E. C. S. CLENCH　　2,299,211
FLUID PRESSURE REMOTE CONTROL SYSTEM
Filed May 7, 1940　　4 Sheets-Sheet 2

E. C. S. Clench
INVENTOR
By: Stevens and Davis
ATTYS.

Oct. 20, 1942.  E. C. S. CLENCH  2,299,211
FLUID PRESSURE REMOTE CONTROL SYSTEM
Filed May 7, 1940  4 Sheets-Sheet 3

E. C. S. Clench
INVENTOR
By Stevens and Davis
ATTYS.

Patented Oct. 20, 1942

2,299,211

UNITED STATES PATENT OFFICE 2,299,211

FLUID PRESSURE REMOTE CONTROL SYSTEM

Edward Claude Shakespeare Clench, London, England, assignor to Automotive Products Company Limited, London, England Application May 7, 1940, Serial No. 333,869
In Great Britain May 11, 1939

19 Claims. (Cl. 121—38)

This invention relates to fluid pressure remote control systems, and it has for its primary object to provide an improved form of system having a preselector action. The system is particularly applicable for operating the governors of aircraft and other engines, especially governors which are used in conjunction with variable pitch propellers.

It is a further object of the invention to provide an improved fluid pressure remote control system, conveniently operated by pressure liquid, which system embodies one or more motor units which are arranged to take up any one of three or more definite positions when fed with an unrestricted supply of pressure fluid, the particular position assumed by the motor unit depending upon which of a plurality of connections is or are supplied with the said pressure fluid. The term "unrestricted" is intended to mean that the supply of pressure fluid is not cut off when the motor unit reaches its desired setting or position, as occurs in some fluid pressure remote control systems, but in the present invention the motor unit is automatically arrested when the desired position is reached, despite the fact that the supply of pressure fluid is maintained. By "fluid" is meant either a liquid or gaseous operating medium. A still further object of the invention consists in the provision of an improved construction of motor unit.

According to the invention a motor unit is provided for a fluid pressure remote control system, said unit comprising in combination a cylinder having a pressure fluid connection at each end a main piston having a piston rod extending through one end of said cylinder, a sleeve member telescopically slidable relative to the cylinder and the main piston, its movement relative to the main piston being limited by a projection on the sleeve member, a hollow stop member slidable in the opposite end part of the cylinder, its end nearest the main piston containing a member movable as one with the said main piston, and a main coiled compression spring urging the sleeve member in an axial direction away from the said one end of the cylinder; the arrangement being such that when pressure fluid is fed to only one of the pressure fluid connections it causes the main piston to assume its extreme position nearest the opposite end of the cylinder; when no pressure liquid is fed to either of said end connections the main coiled spring urges the main piston to one intermediate position; and when pressure fluid is fed to both end connections simultaneously the main piston is urged to another intermediate position.

The invention is illustrated by way of example in the accompanying drawings, in which.

The two general forms of system shown in the drawings are both primarily intended for use in conjunction with a constant speed governor of a variable pitch aircraft propeller. The motor unit is provided to enable the governor to be adjusted remotely from the pilot's cabin of the aircraft and is arranged so that by causing the motor unit to assume any one of a predetermined number of settings the governor and consequently the approximate pitch of the airscrew is correspondingly regulated. In the normal governor installation for which the present remote control systems have been designed provision is made for four distinct positions or settings. The first, in which the piston rod of the motor unit is extended as far as possible, causes the propeller to have an exceptionally coarse pitch; the second corresponds to the pitch required for cruising; the third position is used more especially when the aircraft is climbing; and the fourth position, in which the piston rod is retracted to its maximum extent, corresponds with the pitch required when the aircraft is taking-off. The actual form and construction of the governor constitute no part of the present invention and therefore need not be described.

Figure 1:
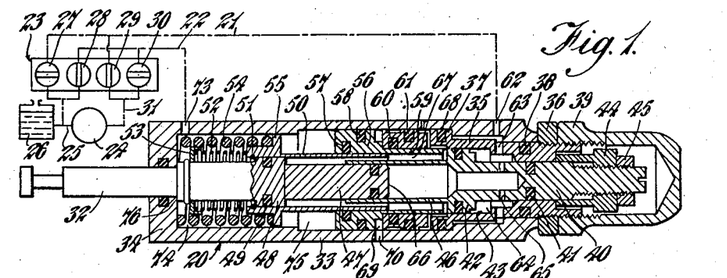
Figures 1 to 4 are sectional side elevations of one construction of motor unit showing the main piston in its various predetermined positions, the parts of an elementary liquid pressure remote control system being indicated diagrammatically to a reduced scale.

Referring firstly to Figures 1 to 4, the motor unit is indicated generally at 20 and is connected by a pair of pipelines 21 and 22 with a valve device indicated generally at 23. The requisite liquid pressure is derived from a continuously driven engine pump 24, which of course would be equipped with suitable cut-out mechanism (not shown) for reducing the load on the pump when no pressure liquid is required by the system, the inlet connection 25 of said pump 24 being connected with a reservoir 26 from which the system is replenished. The inlet 25 is also connected with a pair of valves 27 and 28 leading to the pipelines 21 and 22 respectively, while the latter are joined to the outlet 31 of the pump 24 by a further pair of valves 29 and 30 respectively. The valves 27—30 are operated by a single control member, as will be hereinafter described with reference to Figures 5 to 7, said control member having four operative positions corresponding to those mentioned above and being arranged so that when it is placed in any one of said positions the valves are actuated to cause a piston rod 32 to assume its corresponding position automatically. As shown in Figure 1, the valves 27 and 30 are "off" and the valves 28 and 29 are "on," so that the pipeline 21 is connected with the pressure source comprising the pump outlet 31, while the pipeline 22 is in communication with the pump inlet 25 and the reservoir 26.

The motor unit 20 comprises a cylinder 33 having a front end wall 34 through which the piston rod 32 passes slidably. At its opposite end the cylinder 33 is fitted, for convenience in manufacture, with a fixed stop member 35, which is axially bored and is secured in position by a nut 36, packing washers 37, 38 and 61 being provided to prevent leakage of liquid. A hollow cap nut 39 is secured to the projecting part of the fixed stop member 35 and accommodates the rear end of a hollow stop member 40, the latter being provided with a packing 41 co-acting with the interior of the said fixed stop member 35, while a piston-like enlargement 42, also provided with a packing, slides within an enlarged bore 43 of the fixed stop member 35. The extent of this sliding movement in a forward direction (i. e., towards the left) is limited by an adjusting nut 44 which is secured in position upon the hollow stop member 40 by a lock nut 45. At its front end the hollow stop member 40 has a tubular extension 46 within which a plunger 47 is slidably fitted, the front end of said plunger being arranged to co-operate with a main piston member 48 formed in one with the piston rod 32. The main piston 48 is provided with a packing 49 and is slidable within the bore of a sleeve member 50, relative axial movement between these parts in one sense being limited by an inward projection 51 carried by the sleeve member 50, said projection conveniently comprising a wire ring fitting into a groove in said sleeve member 50. The main piston 48 is urged into engagement with the projection 51 owing to the action of an auxiliary coiled compression spring 52, which at one end bears against the sleeve member 50 and at its other end engages within a recessed flange or washer 53 attached to the piston rod 32. The sleeve member 50 is, moreover, urged in a rearward direction by a relatively strong main compression spring 54 which operates between the inside of the end wall 34 and a flange 55 formed upon the sleeve member 50, the main spring 54 thus being capable of urging the main piston 48 in a rearward direction owing to the projection 51. The rear end of the sleeve member 50 fits slidably into a tubular stop member 56, which latter is slidable within the cylinder 33 and is provided with internal and external packings 57 and 58 respectively. These packings are arranged so that the friction afforded by the packing 58 is greater than that of the packing 57, thus causing the tubular stop member 56 to adhere to the cylinder 33 rather than to the sleeve member 50 when the said sleeve member 50 is moving in an axial direction. The tubular stop member 56 has a rearward extension 59 which is slidable within the bore 43 of the fixed stop member 35, a packing 60 being provided for preventing leakage.

The pipeline 21 leads into a connection 62 at the rear of the cylinder 33 and this communicates by way of holes 63 in the fixed stop member 35 with a working space 64 behind the piston-like enlargement 42 of the hollow stop member 40. The latter is also formed with holes indicated at 65, whereby the pressure of the liquid in the working space 64 can act upon the rear end surface 66 of the plunger 47. The space 67 between the parts 46 and 47 on the one hand and the parts 50 and 59 is connected with the atmosphere by way of a passage indicated at 68. A working space 69 between the front end of the fixed stop member 35 and the tubular stop member 56 communicates by way of a connection 70 and a pipeline 71 (see Figure 2) with a pump unit 72, whereby pressure liquid can be forced into the space 69 for adjusting the second or "cruise" position, as will be hereinafter described. At the front end of the cylinder 33 another connection 73 is provided and is arranged to place the pipeline 22 into communication with a working space 74 within which the springs 52 and 54 are disposed. As the flange 55 has considerable clearance within the cylinder 33, any pressure existing in the working space 74 is present also within the space 75 between the flange 55 and the tubular stop member 56.

In Figure 1 the parts are shown in the positions which they occupy in order that the piston rod 32 may assume its first position, namely that in which it is extended as far as possible. For this purpose the control valve device 23 is set so as to supply pressure liquid to the pipeline 21 and thus to the connection 62, the said pressure liquid being permitted to act upon the rear surface 66 of the plunger 47 so as to move the latter as far as possible in a forward direction. The plunger 47, of course, pushes upon the main piston 48 and this, by engagement with the projection 51, urges the sleeve member 50 in a forward direction, the force exerted by the plunger 47 being sufficient to compress the main spring 54 until a shoulder 76 upon the piston rod 32 engages with the end wall 34 of the cylinder 33. At the same time, of course, the pressure liquid is acting upon the piston-like enlargement 42 of the hollow stop member 40, but this has no effect on account of the adjusting nut 44. The spaces 74 and 75 are, of course, open to the reservoir 26.

Figure 2:
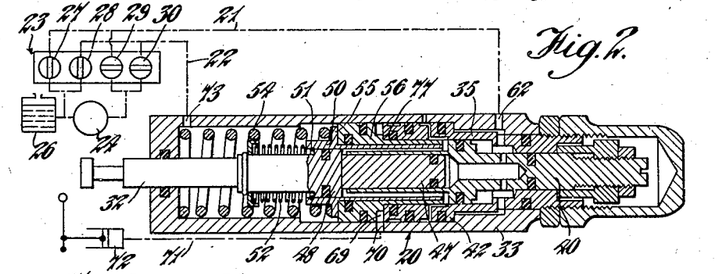

The second or "cruise" position of the piston rod 32 is shown in Figure 2, and this is brought about by placing both of the pipelines 21 and 22 into communication with the reservoir 26, no pressure liquid whatever being fed to the motor unit 20 from the pump 24. Thus the main spring 54 is free to expand and it forces the sleeve member 50 so that its flange 55 engages with the front of the tubular stop member 56. The latter is formed with a shoulder 77, which abuts against the fixed stop member 35 so that this prevents further expansion of the spring 54. In the meantime the auxiliary spring 52 holds the main piston 48 against the projection 51, thus locating the piston rod 32 in its second position. Incidentally the usual spring of the customary form of governor (not shown) also acts to create tension in the piston rod 32 and so helps to hold the main piston member 48 against the projection 51. Provision is made for finally adjusting the piston rod 32 when the system is set to the condition shown in Figure 2 and this is effected by operating the pump unit 72 so as to inject a limited and predetermined quantity of pressure liquid into the working space 69. It will be seen that this causes the tubular stop member 56 to be moved forwards and thus correspondingly shifts the position occupied by the piston rod 32. The latter, as shown in Figure 2, is at the rearmost end of this range of adjustment, which adjustment, of course, can readily be effected by the pilot during flight, the pump unit 72 being disposed in the cabin of the aircraft.

Figure 3:
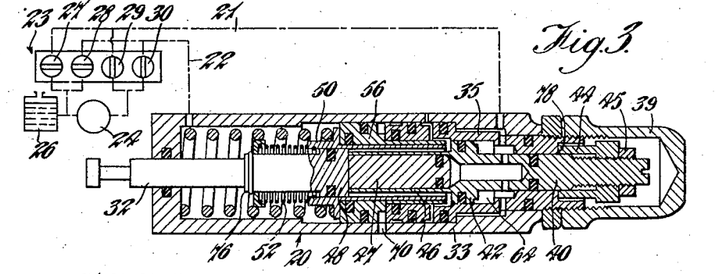

To bring the piston rod 32 to the third position, as indicated in Figure 3, the control valve device 23 is operated as shown, so that pressure liquid is supplied simultaneously to both pipelines 21 and 22. When this occurs the liquid from the pipeline 22 acts upon the front annular face of the main piston member 48 and also upon the shoulder 76 so as to force said main piston member 48 against the tubular extension 46 of the hollow stop member 40, the auxiliary coiled compression spring 52 becoming slightly compressed. At the same time pressure liquid from the pipeline 21 is acting upon the rear surface of the piston-like enlargement 42 of the hollow stop member 40, thus holding the adjusting nut 44 in firm engagement with a shoulder 78 upon the fixed stop member 35. The effective cross-sectional area of the working space 64 is such that with equal pressure in the pipelines 21 and 22 the force exerted upon the piston-like enlargement 42 is decidedly greater than that exerted in the opposite direction upon the main piston 48 and the shoulder 76. It will thus be seen that the position occupied by the piston rod 32 is determined primarily by the adjusting nut 44, and this enables the third position of the piston rod 32 to be regulated at will during installation, the adjustment being secured by the lock nut 45, while the replacement of the cap nut 39 protects the movable parts 40, 44 and 45 from injury.

Figure 4:
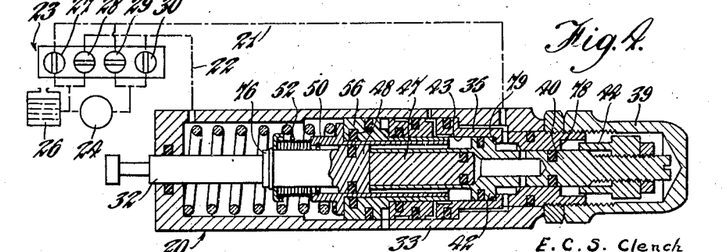

The fourth position of the piston rod 32 is depicted in Figure 4 and is brought about by arranging the control valve device 23 so that it delivers pressure liquid only into the pipeline 22, the pipeline 21 being connected with the reservoir 26. It will be seen that the conditions are substantially the same as in the previous position, but the withdrawal of pressure from the rear surface of the piston-like enlargement 42 of the hollow stop member 40 enables the force exerted upon the main piston member 48 and the shoulder 76 to shift the said hollow stop member 40 bodily to the right until the piston-like enlargement 42 engages with a shoulder 79 formed inside the hollow stop member 40 at the rear end of the bore 43. During this movement, of course, the auxiliary spring 52 is further compressed.

Figure 5:
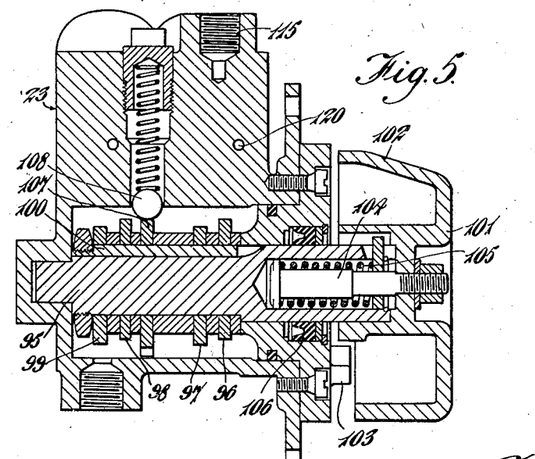
Figure 5 is a sectional side elevation of one form of control valve device for use with the motor unit shown in Figures 1 to 4.
Figures 6, 12:
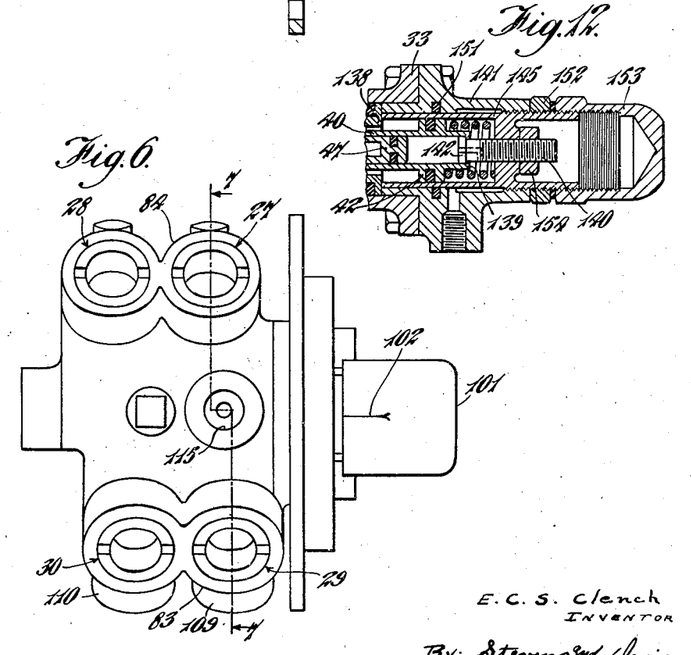
Figure 6 is a plan corresponding to Figure 5.
Figure 12 is a fragmentary sectional elevation of an adjusting device for use in connection with the motor unit shown in Figures 8 to 11.
Figure 7:
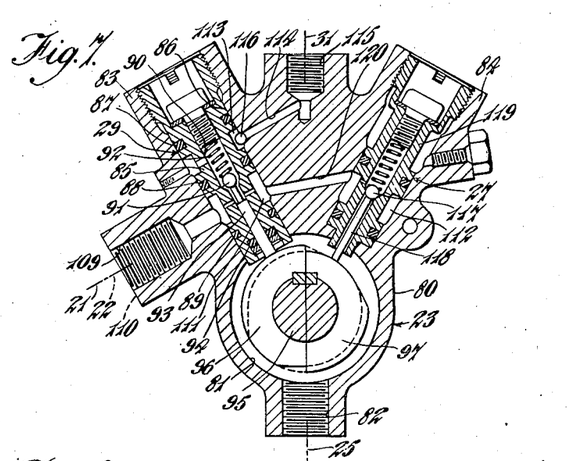
Figure 7 is a transverse sectional elevation taken on the line 7—7 of Figure 6.

A convenient construction of control valve device 23 suitable for the arrangement of motor unit in Figures 1 to 4 is shown in Figures 5 to 7. It comprises a body 80 having at its lower part a cavity 81 with a connection 82 leading to the reservoir 26 of the system (see Figure 1). The upper part of the body 80 is somewhat V-shaped, one limb 83 being arranged to house the two pressure valves 29 and 30 (see Figures 1 and 6) and the other limb 84 similarly accommodating the return valves 27 and 28. The two pressure valves are of similar construction, as also are the return valves, and one of each is shown in Figure 7. The pressure valve 29 comprises a guide member 85 which fits snugly into a bore 86 formed in the body 80, said guide member being grooved for the reception of packing rings 87, 88 and 89 and having a longitudinal bore 90 accommodating a ball 91 which is urged on to its seating by a spring 92. A push rod 93 passing through a packing gland 94 is adapted to lift the ball 91 off its seating and is operated by a cam 96 secured to a spindle 95 extending through the cavity 81. The spindle 95 carries in addition other cams 97, 98 and 99, which operate respectively the valves 27, 30 and 28. The cams are connected with the spindle 95 by a key 100 and said spindle is fitted with a knob 101 formed with a pointer 102 which is adapted to be turned to any one of four positions corresponding with the four positions of the slave unit. As the first position, which brings the governor to its "coarse" setting, is very rarely, if ever, required during normal flying, the pointer 102 is prevented from being turned to this position by a pair of stops, one of which is indicated at 103. The knob 101, which carries an auxiliary spindle 104 pressed inwards by a spring 105, can, however, be pulled outwards against the influence of said spring so as to enable the pointer 102 to assume a position between the stops 103. A packing 106 prevents leakage of liquid from the cavity 81, while the spindle 95 is resiliently located in each of its four positions by the provision of a notched cam disc 107, the periphery of which is engaged by a spring-pressed ball 108. The cams 96—99 are, of course, shaped so that for each position of the knob 101 the appropriate valves 27, 28, 29 and 30 are open. Reverting to Figure 7, the body 80 is formed with a connection 109 for the reception of the pipeline 21, while a similar connection 110 is coupled to the pipeline 22. The connection 109 leads to an annular space 111 and this in turn communicates with the underneath of the ball 91 by radial passages as shown, and also by a passageway 120 with an annular space 112 in the valve 27. Another annular space 113 communicating with the space above the ball 91 leads by way of a passage 114 to a connection 115, to which the pump delivery 31 is joined. A passage 116 leads from the annular space 113 of the valve 29 to the corresponding space of the valve 30. Thus when the ball 91 is lifted off its seat by the cam 96 pressure liquid is able to pass through the passage 114, past the ball 91 and thence to the pipeline 21. The valve 27 (and also the valve 28) also has a ball indicated at 117, which is urged closed by a spring and is adapted to be lifted off its seat by a push rod 118 fitting loosely within a bore formed in the guide member 119 of the valve 27. The annular space 112 communicates with the space above the ball 117 so that when the latter is lifted off its seating the pipeline 21 is placed in communication with the reservoir by way of the clearance space around the push rod 118 and the connection 82.

Figure 8:
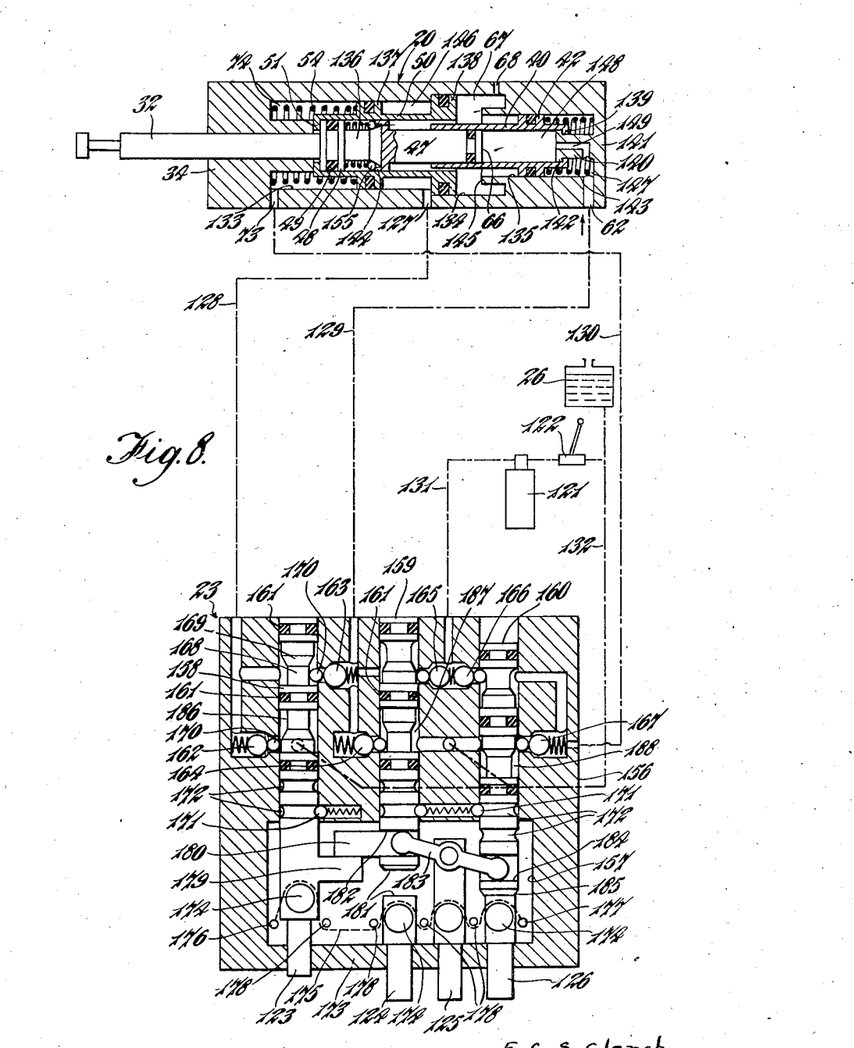
Figure 8 is a general view of a modified form of remote control system with the control valve device and the motor unit shown in section.

A modified form of liquid pressure remote control system is shown diagrammatically in Figure 8, and in this case the motor unit 20 is supplied with pressure liquid from a hydraulic accumulator 121 arranged to be charged as required from a reservoir 26 by means of a hand pump 122. The control valve device, again indicated at 23, has a set of four push buttons 123, 124, 125 and 126, these corresponding to the four possible positions which the piston rod 32 of the motor unit 20 can be caused to assume automatically. In this example the motor unit 20 is provided with three connections 73, 127 and 62, which are coupled with the control valve device 23 by pipelines 128, 129 and 130 respectively. The pressure liquid from the accumulator 121 enters the control valve device 23 through a connection 131, while a branched connection 132 leads back to the reservoir 26.

The motor unit 20 comprises a cylinder 33 having three distinct bores, namely an intermediate diameter bore 133 at its forward end, behind which is a large diameter bore 134 and then a small diameter bore 135. The front wall 34 of the cylinder is again arranged for the slidable reception of the piston rod 32 and the latter is formed at its rear end with a main piston member 48 having a rearward extension 136. As in the previous example, the main piston member 48 is slidably mounted in a sleeve member 50 having an inward projection 51 in the form of a flange. Upon its exterior the sleeve member 50 has a smaller collar 137 provided with a packing and sliding within the bore 133, while its rear extremity carries a larger collar 138 having a packing and adapted to slide within the bore 134. A hollow stop member 40 is formed with a piston-like enlargement 42 sliding within the bore 135 and provided with packing to prevent leakage. The rear extremity of said hollow stop member 40 has an inwardly directed flange 139 which slides over an axial spigot 140 carried by the rear end wall 141 of the cylinder 33, the permissible movement of the hollow stop member 40 being limited by the engagement of the flange 139 with an enlargement 142 upon the end of the spigot 140. A coiled compression spring 143 tends to hold the hollow stop member 40 in this position. A plunger 47 slides within the hollow stop member 40 as before and has a cup-shaped front portion 144 arranged to embrace the extension 136 of the main piston member 48. A main compression spring 54 acts between the end wall 34 of the cylinder and the smaller collar 137 of the sleeve member 50 so as to urge the latter in a rearward direction towards an abutment stop 145 upon the cylinder 33.

The connection 73 leads into the working space 74 in front of the main piston member 48 and the collar 137, while the connection 127 communicates with a working space 146 between the two collars 137 and 138. The space 67, bounded principally by the sleeve member 50 and the hollow stop member 40, is in permanent communication with the atmosphere by way of the passage 68, while the connection 62 at the rear of the cylinder 33 leads into a working space 147 and also to the interior 148 of the hollow stop member 40 by way of a passage 149 formed in the spigot 140.

In order to cause the piston rod 32 to assume its first position, i. e., its fully extended position as shown in Figure 1, pressure liquid is admitted only to the connection 62 by pressing the button 123 (the working of the valve device 23 will be explained hereinafter), and this liquid passes through the passage 149 so as to act upon the surface 66 of the plunger 47. The latter is thus forced as far as possible in a forward direction and pushes the main piston member 48 until it abuts against the flange 51, which in turn engages the front wall 34 of the cylinder 33, the spring 54 in the meantime being compressed.

Figure 9:
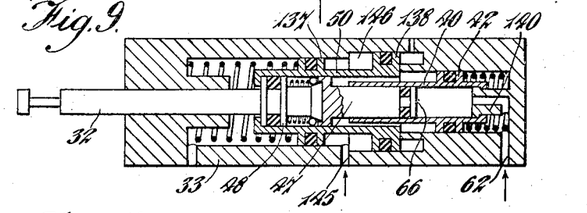
Figures 9 to 11 are sectional views of the motor unit shown in Figure 7 but with the parts in their alternative operating positions.

To bring the piston rod 32 to its second position, shown in Figure 9, pressure liquid is admitted simultaneously to the two connections 62 and 127. The pressure liquid passing through the connection 62 acts the same as for the first position, namely it forces the plunger 47 forwardly. On the other hand the pressure liquid entering the working space 146 through the connection 127 urges the sleeve member 50 rearwardly until it engages with the abutment 145, this being due to the fact that the pressure acting upon the larger collar 138 is decidedly greater than that acting upon the smaller collar 137; the difference between these two pressures should in fact be greater than the total pressure acting upon the surface 66 of the plunger 47 in order to prevent the main piston member 48 from moving the sleeve member 50 in a forward direction.

Figure 10:
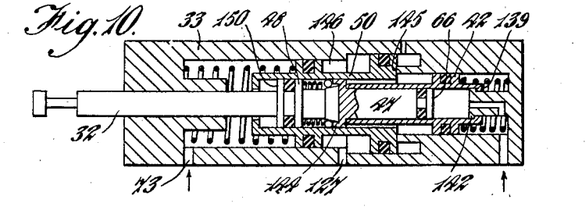

The third position of the piston rod 32, as shown in Figure 10, is obtained by applying liquid pressure to the two end connections 73 and 62 simultaneously, this result being obtained by pressing the button 125, which, in fact also allows pressure liquid to enter the intermediate connection 127, but this liquid does not affect the position of the piston rod 32. As in the second position, pressure liquid entering the connection 62 acts upon the rear surface 66 of the plunger 47 so as to urge the latter in a forward direction, and at the same time the pressure liquid which is present within the working space 147 acts upon the piston-like enlargement 42 of the hollow stop member 40 so as to maintain the flange 139 in firm engagement with the enlargement 142. The admission, however, of pressure liquid through the connection 73 causes the main piston member 48 to be urged rearwardly, and as the area of the annular surface 150 of said main piston is greater than the area of the surface 66 of the plunger 47, the latter is pushed rearwardly until its front portion 144 engages with the front part of the hollow stop member 40. The combined effective areas of the end surface 66 of the plunger 47 and the corresponding surface of the hollow stop member 40, i. .e., the total area which is acted upon by the pressure liquid entering through the connection 62, is greater than the area of the surface 150 and therefore when the front portion 144 of the plunger 47 is brought into engagement with the hollow stop member 40 further movement of the main piston member 48 is arrested and the piston rod 32 remains in the position shown in Figure 10. The admission of pressure liquid to the working space 146 through the connection 127 merely forces the sleeve member 50 against the abutment 145 and has no effect upon the main piston 48.

Figure 11:
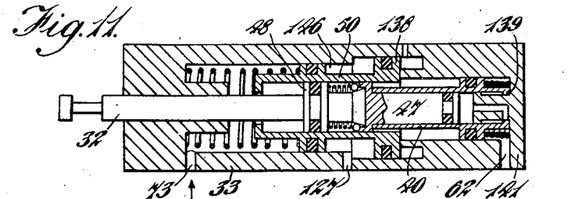

The fourth position of the piston rod 32, as shown in Figure 11, is obtained by admitting pressure liquid only through the front connection 73. This exerts a rearward force upon the main piston member 48, which in turn pushes the plunger 47 as far as possible into the hollow stop member 40, the latter being thereby pressed rearwardly until its flange 139 engages with the end wall 141 of the cylinder 33. It will be appreciated that the motor unit in Figures 8 to 11 is shown diagrammatically; in its constructional form means can readily be incorporated whereby the position occupied by the piston rod 32 in its second and third positions (Figures 9 and 10 respectively) may be precisely adjusted during installation and an arrangement suitable for this purpose is shown in Figure 12. This is a fragmentary sectional elevation representing the rear part of the cylinder 33. The end wall 141 is formed separately from the cylinder itself and it is fitted with an abutment stop member 145 screw-threaded into position so as to be capable of being adjusted in an axial direction. A packing ring 151 prevents leakage of liquid and the desired adjustment is maintained by a lock nut 152 and a cap nut 153. By shifting the abutment stop 145 in an axial direction the extent to which the sleeve member 50 is permitted to move rearwards is modified and thus alters the second working position occupied by the piston rod 32. The spigot 140 is in turn screw-threaded within the abutment stop 145, thus enabling it also to be adjusted axially, the setting being preserved by a lock nut 154. The adjustment of the spigot 140 determines the third position of the piston rod 32, as will be readily apparent from Figure 10.

The main spring 54 in the arrangement shown in Figures 8 to 11 urges the sleeve member 50 against the abutment stop 145, so that if the pressure liquid should fail the piston rod 32 will be prevented from assuming the first position, which normally corresponds to the "coarse" setting of the propeller. A frictional ratchet device indicated at 155 in Figures 8 to 11 acts to prevent forward movement of the main piston 48 relative to the sleeve member 50 except when said main piston 48 is pushed by the plunger 47. In the latter circumstances the cup-shaped front portion 144 releases the balls of the frictional ratchet device, and it will be seen, therefore, that this also tends to retain the piston rod 32 in a partly or completely retracted position in the event of a failure of the pressure liquid, thus preventing said piston rod from being moved to its first position owing to the action of the usual spring of the governor (not shown).

The control valve device 23 included in Figure 8 comprises a body 156 formed at its front part with a cavity 157, its rear part having three mutually parallel bores for the reception of slidable plunger members 158, 159 and 160. Each of these is provided with packing washers 161, as shown, for preventing leakage of liquid and is adapted to operate mechanically two ball valves, these being indicated at 162, 263; 164, 165; and 166, 167. Each is spring-urged to close on its seating in a direction towards the particular plunger member by which it is actuated. For operating the valves each plunger member 158—160 is formed with two waist portions 168 terminating at one end in a frusto-conical part 169 adapted to act as a cam surface in conjunction with a ball 170 so that when said ball rides up the cam surface 169 it forces the corresponding valve member 162—167 off its seating. On the other hand, when the waist portion 168 is brought opposite the ball 170 the corresponding valve member is permitted to close. Each of the plunger members 158—160 has two operative positions, and it is held resiliently in both of these by a spring-pressed ball 171 adapted to engage with either of two grooves 172 so as to prevent the plunger member from being displaced, for example by vibration.

The push buttons 123—126 are slidably mounted in the front wall 173 of the body 156, and each has a projection 174 arranged to be engaged by a chain or like flexible member 175. The ends of this member are anchored at 176 and 177, and between the push buttons 123—126 said chain or equivalent passes around pins 178, but the length of the chain or equivalent is such that only one push button can be depressed at a time, and the pushing in of a second button automatically causes the first to be restored to its out position. The push button 123 is fastened to or formed integrally with the plunger member 158, which has a lateral projection 179 adapted to engage with a similar projection 180 upon the forward part of the plunger member 159. The latter is, however, separated from its push button 124 at 181, and is formed with a groove 182 engaged by a rocking lever 183 pivoted at its centre to the push button 125. The opposite end of said lever 183 engages a similar groove 184 formed in the plunger member 160 and this member is also separated from its corresponding push button 126, as indicated at 185.

The various connections are clearly shown in Figure 8, the pipeline 132 from the reservoir 26 being in permanent connection with the foremost waist portions 186, 187 and 188 of the three plunger members. When the push button 123 is operated to bring the piston rod 32 to its first position, as shown in Figure 8, it moves the two plunger members 158 and 159 to their rearmost positions, owing to the lateral projections 179 and 180. This valve member 165 is opened to allow pressure liquid to flow through the pipeline 129 to the connection 62 of the slave cylinder, while valve members 162 and 167 are also open so as to place the pipelines 128 and 130 in communication with the reservoir 26, the other valve members being closed. By depressing push button 124 the push button 123 and its plunger member 158 are returned to their foremost positions, thus leaving the plunger member 159 in its rearmost position. In this way valve members 165 and 163 are opened, thus allowing the pressure liquid from the pipeline 131 to flow to pipelines 128 and 129. The third pipeline 130 is connected with the reservoir, owing to the fact that the valve member 167 is open, the remainder of the valve members being closed. Depression of the push button 125 to bring the piston rod 32 to its third position actuates the rocking lever 183, thus moving both of the plunger members 159 and 160 to their rearmost positions. In these conditions the valves 163, 165 and 166 are all open and permit the pressure liquid from the pipeline 131 to flow into all three connections 73, 127 and 62 of the motor unit, thus bringing the various parts of the latter to the positions shown in Figure 10. The reservoir 26 in this case is isolated completely from the motor unit, as the valves 162, 164 and 167 are all closed. The supply of pressure liquid is directed to the connection 73 of the motor unit to bring the piston rod 32 to its fourth position by depressing the push button 126. This, of course, restores the push button 125 (assuming that this was the push button previously operated), and the rocking lever 183 has the action of restoring the plunger member 159 to its forward position, so that, with only the plunger member 160 in its rearmost position, the valve 166 is open and permits the pressure liquid to flow into the pipeline 130. The pressure liquid is otherwise cut off, as the valves 165 and 167 are both closed, although the valves 163 and 164 are open and thus place the pipelines 128 and 129 into communication with the reservoir 26.

It will be appreciated that the above is given merely as an example of the manner in which the invention may be carried into effect and that numerous modifications are possible.

The invention may, of course, be applied for any remote controlling operation, and it will be appreciated that the arrangements described are suitable for operation by pressure fluid which may be either a gas or a liquid.

What I claim is:

1. For a fluid pressure remote control system, a motor comprising in combination a cylinder having a pressure fluid connection at each end, a main piston having a piston rod extending through one end of said cylinder, a sleeve member telescopically slidable relative to the cylinder and the main piston, its movement relative to the main piston being limited by a projection on the sleeve member, a hollow stop member slidable in the opposite end part of the cylinder, its end nearest the main piston containing a member movable as one with the said main piston, and a main coiled compression spring urging the sleeve member in an axial direction away from the said one end of the cylinder, the arrangement being such that when pressure fluid is fed to only one of the pressure fluid connections it causes the main piston to assume its extreme position nearest the opposite end of the cylinder; when no pressure liquid is fed to either of said end connections the main coiled spring urges the main piston to one intermediate position; and when pressure fluid is fed to both end connections simultaneously the main piston is urged to another intermediate position.

2. A motor as claimed in claim 1, wherein the hollow stop member has its end part slidable axially through that end wall of the cylinder opposite to the piston rod.

3. A motor as claimed in claim 1, wherein a tubular stop member is interposed between the sleeve member and the cylinder so as to act as a piston, a working space being provided between said tubular stop member and the end of the cylinder so that pressure liquid injected into said space from a source of pressure fluid serves to change the position of said tubular stop member and correspondingly adjust the intermediate position of the main piston.

4. A motor as claimed in claim 1, wherein a tubular stop member is interposed between the sleeve member and the cylinder so as to act as a piston, a working space being provided between said tubular stop member and the end of the cylinder so that pressure liquid injected into said space from a source of pressure fluid serves to change the position of the said tubular stop member and correspondingly adjust the intermediate position of the main piston, and wherein the tubular stop member carries external and internal packings for co-operation with the cylinder and the sleeve member respectively, the packing which engages the cylinder being arranged to have a greater working friction than the other, for the purpose described.

5. A motor as claimed in claim 1, wherein the hollow stop member is provided with a screw-threaded nut or equivalent which serves to regulate the sliding movement of said hollow stop member relative to the cylinder and thus to adjust one of the intermediate positions of the main piston.

6. A motor as claimed in claim 1, wherein an auxiliary coiled compression spring acts between the main piston and the sleeve member to maintain the main piston in engagement with the projection upon the sleeve member.

7. A motor as claimed in claim 1, wherein the hollow stop member contains a plunger which abuts axially against the main piston so as to move as one therewith, said plunger, however, being free to move laterally relative to said main piston to avoid binding of the members due to any inaccuracy in the alignment of the engaging parts thereof.

8. A motor as claimed in claim 1, wherein the hollow stop member is arranged to slide in a fluid-tight manner within the cylinder, and the space disposed between the outside of said hollow stop member and the interior of the sleeve member is in communication with the atmosphere, so that the hollow stop member is urged by the pressure fluid to oppose movement of the main piston under the action of pressure fluid admitted to the opposite end of the cylinder and thus locates the said main piston in its second intermediate position.

9. A motor as claimed in claim 1, wherein a frictional ratchet device is provided between the main piston and the sleeve member, said ratchet device being arranged to prevent movement of the main piston towards the projection on the sleeve member, but being released by movement of the plunger in a direction towards the main piston.

10. For a fluid pressure remote control system, a motor cylinder unit comprising a cylinder, a plurality of connections for pressure fluid leading thereto, a piston member in said cylinder, said piston member comprising a main part and a smaller diameter plunger part, a hollow stop member within which the said plunger part of the piston member slides, the outside of the hollow stop member being larger in diameter than the main part of the piston member, a stop on the cylinder adapted to be engaged by the hollow stop member to arrest the piston member in a position intermediate the ends of its stroke when pressure fluid is fed simultaneously to both ends of the cylinder, an abutment stop on the cylinder, and a sleeve member which is slidably interposed between the main part of the piston member and the cylinder, and is urged towards the said hollow stop member, a projection carried by the sleeve member being adapted to engage with the main part of the piston member so that as said sleeve member engages with the said abutment stop on the cylinder the piston member is brought to a predetermined fourth position lying between one end position and the said intermediate position.

11. A motor cylinder unit as claimed in claim 10, wherein the main part of the piston is formed separately from the plunger part, which latter abuts against the said main part of the piston member to form an axial extension thereof.

12. A motor cylinder unit as claimed in claim 10, wherein the hollow stop member extends through the end of the cylinder and is provided with screw threaded adjusting means enabling its operative position within the cylinder to be regulated from the outside of the motor cylinder unit.

13. A fluid pressure remote control system comprising in combination a source of pressure fluid, a motor cylinder unit having a plurality of connections for receiving pressure fluid, and a valve device for feeding the pressure fluid simultaneously to a plurality of the said cylinder connections, the motor cylinder unit comprising a cylinder, a plurality of connections for pressure fluid leading thereto, a piston member in said cylinder, said piston member comprising a main part and a smaller diameter plunger part, a hollow stop member within which the said plunger part of the piston member slides, the outside of the hollow stop member being larger in diameter than the main part of the piston member, a stop on the cylinder adapted to be engaged by the hollow stop member to arrest the piston member in a position intermediate the ends of its stroke when pressure fluid is fed simultaneously to both ends of the cylinder, an abutment stop on the cylinder, and a sleeve member which is slidably interposed between the main part of the piston member and the cylinder, and is urged towards the said hollow stop member, a projection carried by the sleeve member being adapted to engage with the main part of the piston member so that as said sleeve member engages with the said abutment stop on the cylinder the piston member is brought to a predetermined fourth position lying between one end position and the said intermediate position.

14. A fluid pressure remote control system as claimed in claim 13, wherein the valve device comprises a set of individual valves, connecting passages between said valves and the motor cylinder unit, and a rotatable cam device having a plurality of operational settings, said cam device being arranged to open a plurality of said valves simultaneously and permit the pressure fluid to flow through the corresponding connecting passages to the connections of the motor cylinder unit, whereby the piston member of said unit is moved to a position corresponding to the setting of the rotatable cam device.

15. A fluid pressure remote control system as claimed in claim 13, wherein the valve device comprises a plurality of valves interposed between the source of pressure fluid, a plurality of push buttons each corresponding to one position of the piston member of the motor cylinder unit, interlocking means for preventing more than one of the push buttons from being actuated at the same time, at least one of the push buttons being arranged to open a plurality of said valves so that, when it is actuated, pressure fluid is fed simultaneously to a plurality of the connections of the motor cylinder unit.

16. In a fluid pressure remote control system, a motor comprising a cylinder, a plurality of operating members disposed therein for movement longitudinally thereof including a main piston and a plurality of auxiliary members coacting with said cylinder, with said piston and with each other to act as stops for said piston in response to fluid pressure thereon, and a plurality of connecting means for admitting fluid under pressure to said cylinder to act on pressure responsive faces of said operating members, at least one of said connecting means admitting fluid under pressure to act on pressure responsive faces of at least two of said operating members one of which is opposed by one of said operating members supplied by another of said connecting means having a pressure response face of substantially different extent and spring biased in relation thereto; whereby said main piston may be caused to assume any one of at least three positions by selective application of unrestricted pressure through no more than two of said connecting means.

17. A motor as claimed in claim 16 wherein at least one of the said auxiliary members is telescopically interposed between the main piston and the cylinder.

18. In a fluid pressure remote control system, a motor comprising a cylinder, a plurality of operating members disposed therein for movement longitudinally thereof including a main piston and a plurality of auxiliary members coacting with said cylinder, with said piston and with each other to act as stops for said piston in response to fluid pressure thereon and connecting means for admitting a fluid under pressure to pressure responsive faces of said operating members; and means to operate said motor comprising a main source of fluid under pressure, a discharge outlet and means for substantially simultaneously connecting each of at least two of said connecting means selectively to either of said source of fluid and said discharge outlet, a master cylinder unit separate from the main source of pressure fluid, and a connection from said master cylinder unit to one of the connecting means of the motor unit, whereby operation of the master cylinder unit serves to adjust one of the stops hydraulically to any desired position within predetermined limits.

19. In a fluid pressure remote control system, a motor comprising a cylinder, a plurality of operating members disposed therein for movement longitudinally thereof including a main piston and a plurality of auxiliary members coacting with said cylinder, with said piston and with each other to act as stops for said piston in response to fluid pressure thereon and connecting means for admitting a fluid under pressure to pressure responsive faces of said operating members; and means to operate said motor comprising a main source of fluid under pressure, a discharge outlet and a valve device comprising a plurality of valves interposed between the source of pressure fluid, a plurality of push buttons each corresponding to one position of the piston member of the motor cylinder unit, interlocking means for preventing more than one of the push buttons from being actuated at the same time, at least one of the push buttons being arranged to open a plurality of said valves so that, when it is actuated, pressure fluid is fed simultaneously to a plurality of the connections of the motor cylinder unit.

EDWARD CLAUDE
SHAKESPEARE CLENCH.